(12) United States Patent
Jost et al.

(10) Patent No.: US 9,514,740 B2
(45) Date of Patent: Dec. 6, 2016

(54) DATA SHREDDING FOR SPEECH RECOGNITION LANGUAGE MODEL TRAINING UNDER DATA RETENTION RESTRICTIONS

(71) Applicant: Nuance Communications, Inc., Burlington, MA (US)

(72) Inventors: Uwe Helmut Jost, Maidenhead (GB); Philip Charles Woodland, Stapleford (GB); Marcel Katz, London (GB); Syed Raza Shahid, Marlow (GB); Paul J. Vozila, Arlington, MA (US); William F. Ganong, III, Brookline, MA (US)

(73) Assignee: Nuance Communications, Inc., Burlington, MA (US)

( * ) Notice: Subject to any disclaimer, the term of this patent is extended or adjusted under 35 U.S.C. 154(b) by 243 days.

(21) Appl. No.: 13/800,738

(22) Filed: Mar. 13, 2013

(65) Prior Publication Data

US 2014/0278425 A1    Sep. 18, 2014

(51) Int. Cl.
  *G10L 15/06* (2013.01)
  *G10L 15/183* (2013.01)

(52) U.S. Cl.
  CPC ............ *G10L 15/063* (2013.01); *G10L 15/183* (2013.01)

(58) Field of Classification Search
  CPC .................................................... G10L 15/063
  USPC ..................................... 704/257, 9
  See application file for complete search history.

(56) References Cited

U.S. PATENT DOCUMENTS

| | | | |
|---|---|---|---|
| 6,141,753 A | 10/2000 | Zhao et al. | |
| 6,404,872 B1 | 6/2002 | Goldberg et al. | |
| 6,600,814 B1 * | 7/2003 | Carter et al. | 379/88.16 |
| 6,874,085 B1 | 3/2005 | Koo et al. | |
| 7,512,583 B2 | 3/2009 | Benson et al. | |
| 7,526,455 B2 | 4/2009 | Benson et al. | |
| 8,185,392 B1 | 5/2012 | Strope et al. | |
| 8,229,742 B2 * | 7/2012 | Zimmerman et al. | 704/235 |
| 8,401,859 B2 | 3/2013 | Dhawan et al. | |
| 8,423,476 B2 | 4/2013 | Bishop et al. | |
| 8,433,658 B2 | 4/2013 | Bishop et al. | |

(Continued)

OTHER PUBLICATIONS

U.S. Appl. No. 13/800,764, "Data Shredding for Speech Recognition Acoustic Model Training Under Data Retention Restrictions," filed Mar. 13, 2013.

(Continued)

*Primary Examiner* — Qian Yang
(74) *Attorney, Agent, or Firm* — Hamilton, Brook, Smith & Reynolds, P.C.

(57) ABSTRACT

Training speech recognizers, e.g., their language or acoustic models, using actual user data is useful, but retaining personally identifiable information may be restricted in certain environments due to regulations. Accordingly, a method or system is provided for enabling training of a language model which includes producing segments of text in a text corpus and counts corresponding to the segments of text, the text corpus being in a depersonalized state. The method further includes enabling a system to train a language model using the segments of text in the depersonalized state and the counts. Because the data is depersonalized, actual data may be used, enabling speech recognizers to keep up-to-date with user trends in speech and usage, among other benefits.

22 Claims, 11 Drawing Sheets

(56) References Cited

U.S. PATENT DOCUMENTS

| | | | |
|---|---|---|---|
| 8,473,451 B1* | 6/2013 | Hakkani-Tur | G06F 21/00 379/201.11 |
| 8,489,513 B2 | 7/2013 | Bishop et al. | |
| 8,515,745 B1 | 8/2013 | Garrett et al. | |
| 8,515,895 B2 | 8/2013 | Benson et al. | |
| 8,561,185 B1* | 10/2013 | Muthusrinivasan | G06F 21/00 705/51 |
| 8,700,396 B1 | 4/2014 | Mengibar et al. | |
| 9,131,369 B2 | 9/2015 | Ganong, III et al. | |
| 2002/0023213 A1 | 2/2002 | Walker et al. | |
| 2003/0037250 A1 | 2/2003 | Walker et al. | |
| 2003/0172127 A1 | 9/2003 | Northrup et al. | |
| 2005/0065950 A1 | 3/2005 | Chaganti et al. | |
| 2006/0085347 A1 | 4/2006 | Yiachos | |
| 2006/0136259 A1 | 6/2006 | Weiner et al. | |
| 2006/0190263 A1 | 8/2006 | Finke et al. | |
| 2007/0118399 A1 | 5/2007 | Avinash et al. | |
| 2007/0282592 A1* | 12/2007 | Huang et al. | 704/9 |
| 2008/0086305 A1 | 4/2008 | Lewis et al. | |
| 2008/0147412 A1 | 6/2008 | Shaw et al. | |
| 2008/0209222 A1 | 8/2008 | Narayanaswami et al. | |
| 2008/0294435 A1 | 11/2008 | Reynolds et al. | |
| 2009/0132803 A1 | 5/2009 | Leonard et al. | |
| 2010/0071041 A1 | 3/2010 | Ikegami | |
| 2010/0242102 A1 | 9/2010 | Cross et al. | |
| 2010/0255953 A1 | 10/2010 | McCullough et al. | |
| 2010/0281254 A1 | 11/2010 | Carro | |
| 2011/0022835 A1 | 1/2011 | Schibuk | |
| 2011/0054899 A1 | 3/2011 | Phillips et al. | |
| 2011/0131138 A1 | 6/2011 | Tsuchiya | |
| 2011/0197159 A1 | 8/2011 | Chaganti et al. | |
| 2012/0010887 A1 | 1/2012 | Boregowda et al. | |
| 2012/0011358 A1 | 1/2012 | Masone | |
| 2012/0059653 A1 | 3/2012 | Adams et al. | |
| 2012/0079581 A1 | 3/2012 | Patterson | |
| 2012/0095923 A1 | 4/2012 | Herlitz | |
| 2012/0101817 A1* | 4/2012 | Mocenigo et al. | 704/231 |
| 2012/0166186 A1 | 6/2012 | Acero et al. | |
| 2012/0201362 A1 | 8/2012 | Crossan et al. | |
| 2012/0278061 A1 | 11/2012 | Weinstein et al. | |
| 2013/0073672 A1 | 3/2013 | Ayed | |
| 2013/0104251 A1 | 4/2013 | Moore et al. | |
| 2013/0243186 A1 | 9/2013 | Poston, Jr. et al. | |
| 2013/0262873 A1 | 10/2013 | Read et al. | |
| 2013/0263282 A1 | 10/2013 | Yamada et al. | |
| 2013/0346066 A1 | 12/2013 | Deoras et al. | |
| 2014/0058723 A1* | 2/2014 | Shen et al. | 704/9 |
| 2014/0067738 A1 | 3/2014 | Kingsbury | |
| 2014/0143533 A1 | 5/2014 | Ganong, III et al. | |
| 2014/0143550 A1 | 5/2014 | Ganong, III et al. | |
| 2014/0163954 A1* | 6/2014 | Joshi et al. | 704/9 |
| 2014/0207442 A1 | 7/2014 | Ganong, III et al. | |
| 2014/0278366 A1 | 9/2014 | Jacob et al. | |
| 2014/0278426 A1 | 9/2014 | Jost et al. | |

OTHER PUBLICATIONS

Calpe, J., et al., "Toll-quality digital secraphone," IEEE conference, 8th Mediterranean vol. 3:1714-1717 (1996).

De Andrade, J. et al., "Speech privacy for modern mobile communication systems," IEEE ICASSP 2008 conference Las Vegas, NV, vol. 1: 1777-1780 (2008).

Fazeen, M. et al., Context-Aware Multimedia Encryption in Mobile Platforms, 9th Annual Cyber and Information Security Research Conference, CISR '14:53-56 (2014).

Office Action dated Apr. 2, 2015 for U.S. Appl. No. 13/800,765 entitled "Data Shredding for Speech Recognition Acoustic Model Training Under Data Retention Restrictions".

Servetti, A. et al., "Perception-based partial encryption of compressed speech," IEEE Transactions on Speech and Audio Processing, 10(8):637-643 (2002).

Office Action dated Sep. 2, 2015 for U.S. Appl. No. 13/800,764.

Office Action dated Dec. 10, 2015 for U.S. Appl. No. 13/800,764.

Chaudhari et al., "Privacy Protection for Life-log Video," Signal Processing Applications for Public Security and Forensics, 2007, Published Apr. 11-13, 2007.

Final Office Action for U.S. Appl. No. 13/800,764 dated May 6, 2016.

Notice of Allowance for U.S. Appl. No. 13/800,764, dated Aug. 26, 2016.

* cited by examiner

DATA SHREDDING FOR SPEECH RECOGNITION LANGUAGE MODEL TRAINING UNDER DATA RETENTION RESTRICTIONS

RELATED APPLICATION

This application is related to U.S. application Ser. No. 13/800,764, entitled "Data Shredding for Speech Recognition Acoustic Model Training under Data Retention Restrictions," filed on Mar. 13, 2013. The entire teachings of the above application are incorporated herein by reference.

BACKGROUND OF THE INVENTION

A speech recognition system typically collects automatic speech recognition (ASR) statistics to train the speech recognition system. The ASR statistics can be used to train language models and acoustic models, which may be employed by the speech recognition system. In general, language models relate to the probability of particular word sequences. Acoustic models relate to sounds in a language.

SUMMARY OF THE INVENTION

A method or system for enabling training of a language model according to an example embodiment of the present invention includes producing segments of text in a text corpus and counts corresponding to the segments of text, the corpus being in a depersonalized state. The method further includes enabling a system to train a language model using the segments of text in the depersonalized state and the counts.

The text corpus may be one ore more messages, e.g., voice mail messages, or transcripts of interview recordings. The segments of text can be n-tuples (or n-grams) and may be non-overlapping segments of text. In some embodiments, the method may further include maintaining a store of the segments of text and the counts. Maintaining the store can include removing all segments of text whose corresponding counts are less than N, and maintaining only the remaining segments of text and the counts.

The method may further include depersonalizing the corpus to change it from a personalized state to the depersonalized state. In an embodiment, depersonalizing the corpus includes replacing personally identifiable information in the corpus with class labels, wherein the personally identifiable information being replaced is personally identifiable information whose type can be identified by the class labels. For example, the personally identifiable information being replaced can include at least one of the following: a phone number, credit card number, name of a person, name of a business, or location. The method may include maintaining a list, not linked to the corpus, of the class labels and counts corresponding to the class labels.

In an embodiment, the method may further include filtering the segments of text by removing from the segments of text those segments that contain personally identifiable information.

The method may further include labeling the corpus or the text segments and counts with metadata. The metadata may include at least one of the following: time of day of the message, area code of the sender, area code of the recipient, call duration, device type, or message type (e.g., automated customer service message).

In an embodiment, the method includes replacing one or more words of the corpus with corresponding one or more word indices, wherein each word index is generated through use of a random hash. A map to the random hashes may be kept secure.

In one embodiment, a system for enabling training of a language model includes a segmentation module configured to produce segments of text in a text corpus and counts corresponding to the segments of text, the text corpus being in a depersonalized state. The system further includes an enabling module configured to enable a system to train a language model using the segments of text in the depersonalized state and their counts.

Embodiments of the present invention have many advantages. Dynamically shredding the text and/or speech corpus, as described herein, results in a list of text segments, e.g., n-grams, and their associated depersonalized audio features (DAFs). The text segments and DAFs cannot be traced back to the original messages, since the original messages (text and audio) themselves are not retained, i.e., they are deleted. Furthermore, embodiments can prevent re-construction of the original messages, since all the text segments and corresponding DAFs (e.g., the shreds) can be randomized and aggregated across a large number of messages. In addition, embodiments allow for all other data from the original message (such as time of conversion, calling identifiers, etc.) to be deleted. What remains is a large collection of text segments (e.g., n-grams or n-tuples), with associated audio features, representing an aggregation of what has been said to the system. The collection of text segments (e.g., n-grams or n-tuples) and audio features can be maintained in a generic, impersonal form that is useful for training a speech recognition system to recognize future utterances. In certain embodiments, the resulting ASR statistics may contain no Personally Identifiable Information (PII).

The collection of ASR statistics is useful for (re-)training a speech recognition system that employs Language Models (LMs) and/or Acoustic Models (AMs). For example, when the original data cannot be retained, the ASR statistics can be used to retrain the ASR models (LM and AM). Benefits of using ASR statistic to (re-)train a speech recognition system include better accuracy of conversions, an ability to keep up to date with user trends in speech and usage, an ability to customize the speech recognition to the needs of the specific users, and a reduction of the volume of unconvertible messages.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Training of speech recognition systems typically requires in-domain training data, but the in-domain data often contains personally identifiable information (PII) that cannot be retained due to data retention restrictions.

Figure 1:
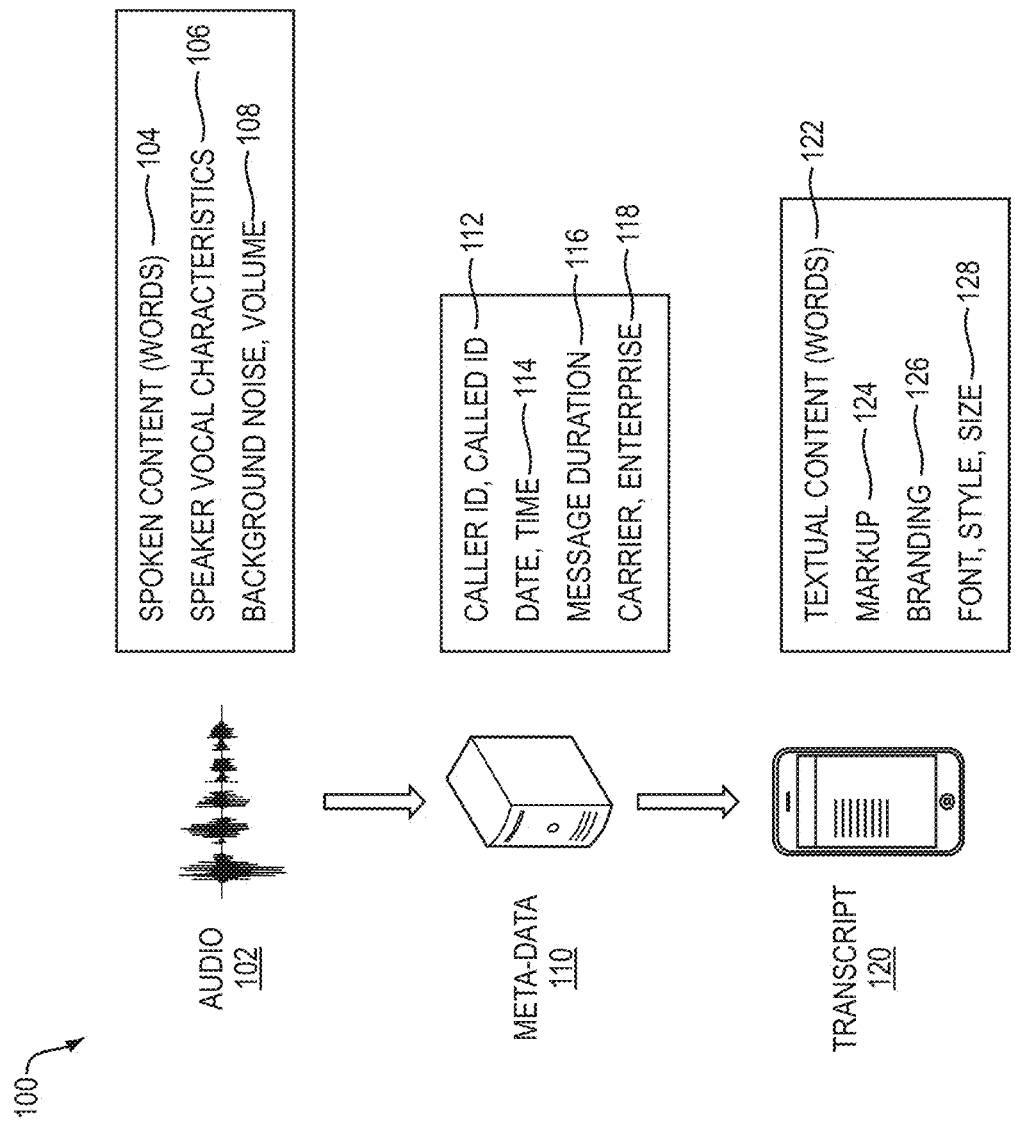
FIG. 1 is a block diagram that illustrates example data that may exist in a speech recognition system.

FIG. 1 illustrates example data that may exist in a speech recognition system 100. The data include audio data 102, metadata 110, and transcript data 120. Audio data 102 can, for example, include spoken content, such as words 104, speaker vocal characteristics 106, and background noise and/or volume 108. Metadata 110 can include caller ID and/or called ID 112 (e.g., area code of sender and/or area code of recipient), date and time 114, message or call duration 116, and carrier and/or enterprise information 118. Metadata 110 may also include device type and message type (e.g., automated customer service message). The transcript data 120 can include textual content, such as words 122, markup information 124, branding information 126, and font, style, and size data 128.

In general, the audio data 102 is captured or generated by a user of the speech recognition system 100, and may be considered an input to the speech recognition system. The metadata 110 relates to the audio data 102 and may be generated or used as part of the processing of the audio data 102 and may be provided to the speech recognition system 100. The metadata is usually delivered in addition to the audio itself. For example, the carrier will send the voice mail recording and at the same time (e.g., in an XML format) the number of the caller. This additional descriptive data, i.e., data about the actual audio data, is commonly referred to as metadata. In a dictation application, metadata can, for example, include the time of the dictation and the name of the user dictation. In the police interview case, metadata can, for example, include the participant(s) and the police case number and the like. The metadata 110 may be used in an embodiment to label the text corpus, segments of text and/or counts of the text segments with the metadata. The transcript data 120 typically relates to the output of the speech recognition system 100, for example, the presentation of the converted text to the user. In some cases, the transcript data 120 can include corrections of the automatic speech recognition output by a human operator/user or entirely manually created transcription. As shown in FIG. 1, the transcript data may relate to presentation of converted text on a mobile device, such as a smart phone.

Figure 2:
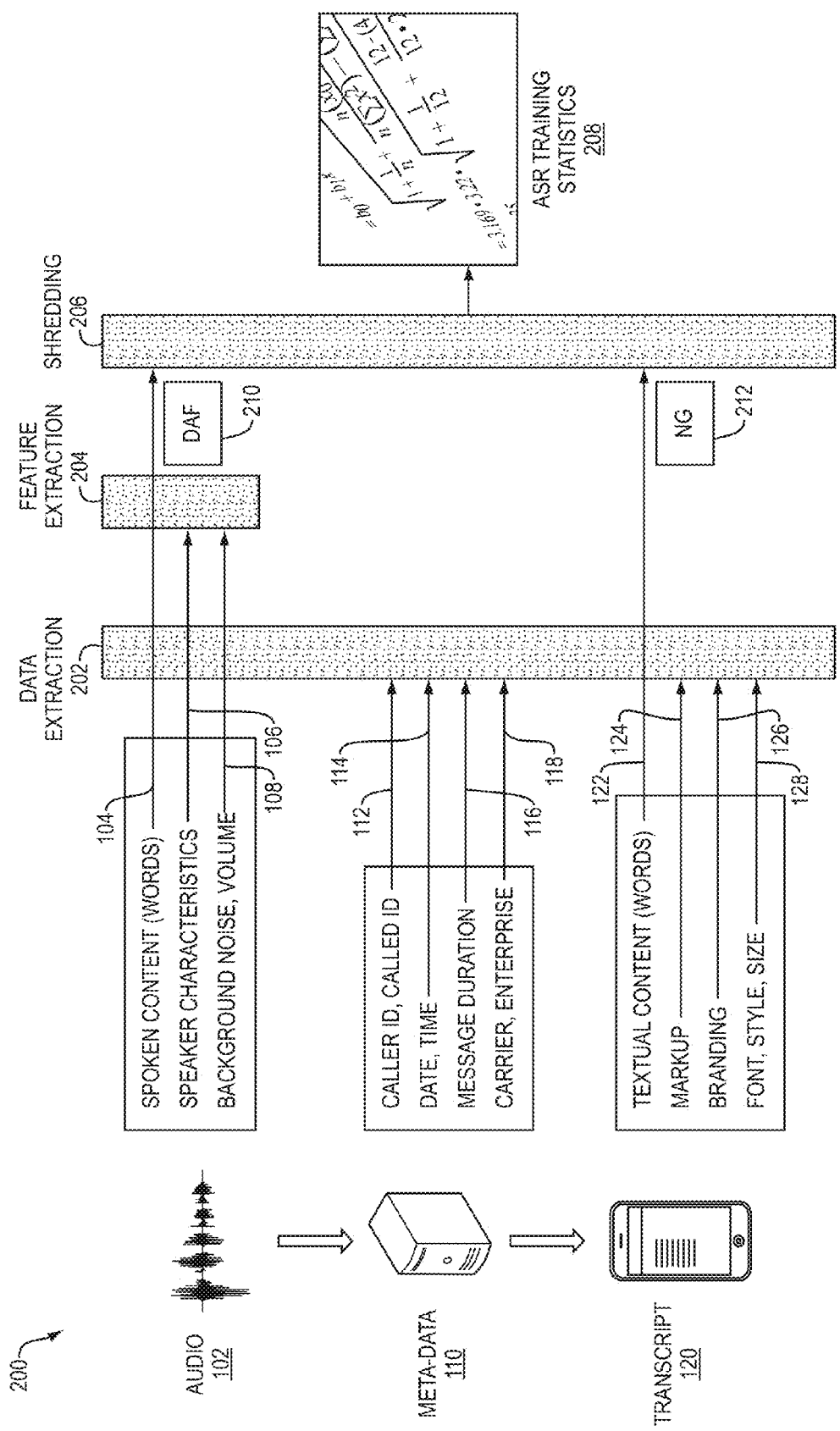
FIG. 2 is a block diagram that illustrates a method and system for generating automatic speech recognition (ASR) training statistics according to an embodiment of the invention.

FIG. 2 illustrates a method and system for generating automatic speech recognition (ASR) training statistics according to an embodiment of the invention. The method and system 200 includes data extraction 202, feature extraction 204, and shredding 206, which may be implemented as separate processes and/or modules. The system 200 takes as inputs the audio data 102, metadata 110, and transcript data 120, and produces ASR training statistics 208 as an output. The individual processes remove (filter out) various items of information to leave only ASR training statistics 208 that have no meaning to a person who may try to get access the information, for example, in search of personally identifiable information. In other words, the data extraction 202 passes through the audio 102 (including everything contained in it) and the textual content 122; other information, such as metadata, markup etc., may not be preserved.

As shown in FIG. 2, audio data 102, including spoken content 104, speaker characteristics 106, and background noise and/or volume 108, is passed through by data extraction 202. Feature extraction 204 filters out speaker characteristics 106 and other characteristics, such as certain noises or volume information 106, and only passes through the audio features, e.g., the depersonalized audio features 210, which still contain information about the actual words spoken but not the other information items.

As shown in FIG. 2, the depersonalized audio features 210 are shredded 206 along with their corresponding segments of text (e.g., n-grams or n-tuples) 212, which were extracted from the transcript data 120. Data that are removed (not passed through) by data extraction 202 include markup 124, branding 126, and font, style and/or size of text 128. Similarly, caller ID or called ID 112, date and time 114, message duration 116, and carrier and/or enterprise information 118, all of which comprise metadata 110, are removed (not passed through) by data extraction 202. Shredding 206 then chops the audio features 210 and segments of text 212 into small pieces that are aggregated (summarized) to produce useful but (to a human) meaningless statistics.

Embodiments of the invention split the speech and/or text corpus up into smaller bits or shreds that are still usable for training while not containing personally identifiable information (PII). This process can be a compromise, because the smaller the bits or shreds, the less useful they are for training but the lower the risk of accidentally retaining any PII. By depersonalizing and/or filtering the data, e.g., the audio features and text segments, the systems and methods described herein can keep larger shreds while still removing PII.

Labeling the corpus and/or the text segments and counts with metadata is useful so that one can still train specific ASR models, or sub-models, after shredding. For example, if one wanted to train a model for the weekend, the metadata can be used to select, from the collection of shreds or segments, the shreds or segments from messages received during weekends.

Acoustic feature extraction results in a compression of the audio data. For example the audio data may be processed in frames where each frame includes a certain number of audio samples. In one example, the audio data is processed at 80 audio samples per frame. The acoustic feature extraction may result in 13 depersonalized audio features per frame. Since the original audio data are not retained, feature extraction results in a compression of audio data.

Acoustic feature extraction is a partially reversible process. The original audio cannot be re-created, but some form of audio can be created. The audio that can be created contains the same words as originally spoken, but, for example, without speaker-specific intonation.

Figure 3:
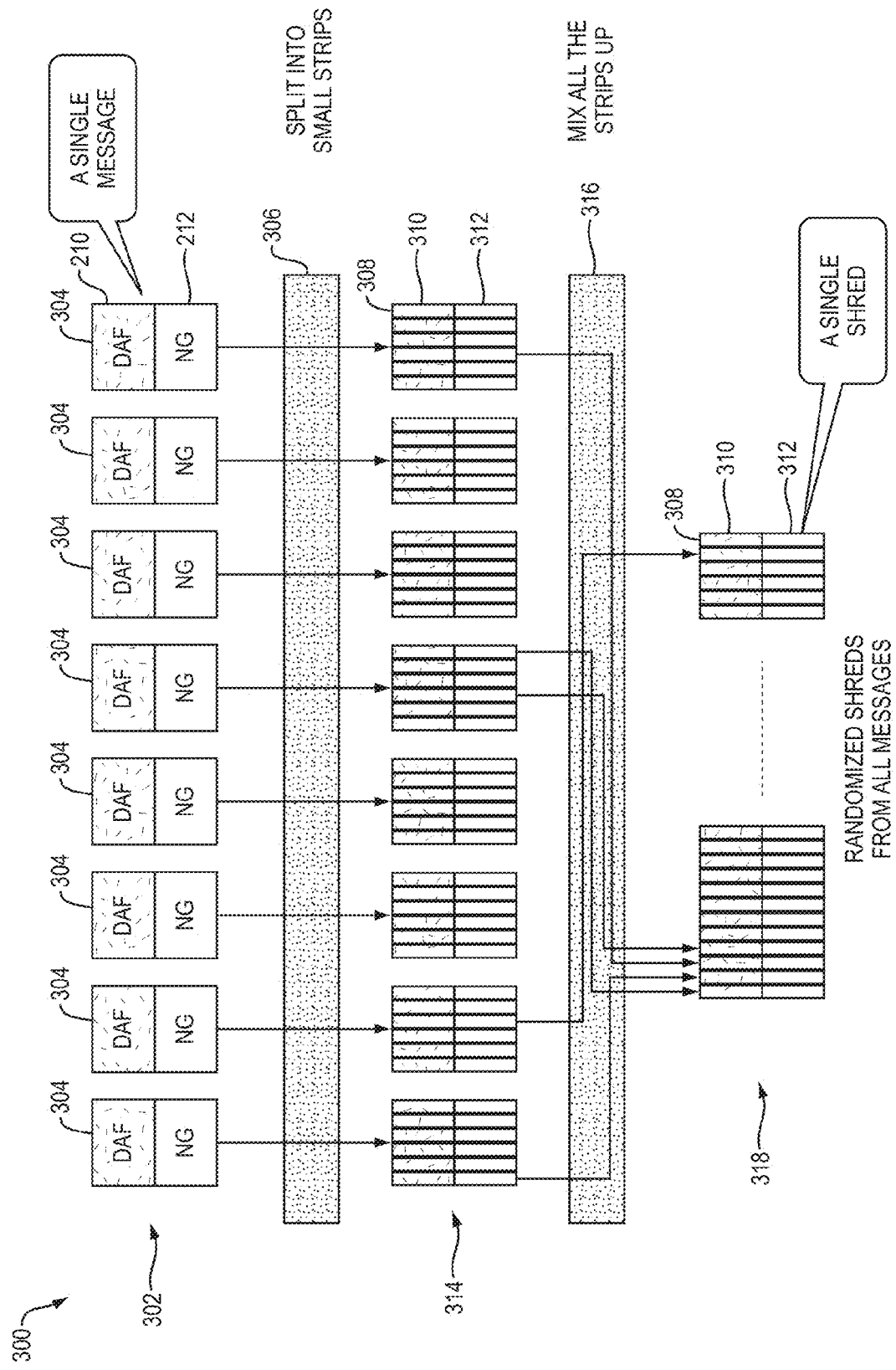
FIG. 3 is a block diagram that illustrates a method and system for shredding data from a speech corpus into data shreds according to an embodiment of the invention.

FIG. 3 illustrates a method and system of shredding data from a speech corpus into data shreds according to an embodiment of the invention. The speech corpus 302 includes a plurality of messages 304. Each message 304 includes audio features 210 and textual content 212. In a first operation 306, each message 304 is split into small strips or shreds 308. The speech corpus 302 is dynamically shredded to produce the shreds 308, which include text segments 312 and the personalized audio features 310 corresponding to the text segments 312. Dynamically shredding the speech corpus may be accomplished by aligning text 212 and audio 210 of the speech corpus and splitting the text 212 and audio 210 at convenient places. This may be performed for each message 304 and for corpus 302. Convenient places for splitting the text 212 and audio 210 can include natural breaks in the speech corpus corresponding to pauses or phrase boundaries.

In some embodiments, the audio features 210 are extracted from the speech corpus 302 and depersonalized. Depersonalization of the audio features may include applying cepstral mean subtraction (CMS), cepstral variance normalization, Gaussianisation, or vocal tract length normalization (VTLN) to the audio features. CMS is useful in removing an offset. For example, CMS can be used to remove a voice from a communication channel. VTLN is useful to normalize voices or voice data. It has been observed that female speakers typically have a shorter vocal tract than male speakers. VTLN can be used to normalize the voice data based on that observation.

Depersonalizing the audio features can include using a neural network to depersonalize the audio features. For example, a neural network system based on trainable features may be used, where the features which are trained to produce the posterior probability of the current frame of input (or a frame with a fixed offset to the current frame) correspond to one or more of a set of linguistic units including word and sub-word units, such as phone units, context-dependent phone units, grapheme units and the like. The depersonalized features can be a fixed linear or non-linear transform of the trainable features. The depersonalized features may be produced via an intermediate "bottleneck" layer created to produce features in trainable structures, such as multi-layer perceptrons, deep neural networks and deep belief networks. Furthermore, depersonalizing the audio features can include applying one or more (e.g., a set of) speaker-specific transforms to the audio features to remove speaker information. The types of speaker-specific transforms that may be used can include linear transforms, such as constrained maximum likelihood linear regression and variants, and speaker-specific non-linear transforms. An advantage of applying speaker-specific transforms is that the system can train for each speaker in the set (using any transform). The system can train the speaker characteristics in order to remove them to thereby depersonalize the audio features.

The collection or store 314 of strips or shreds 308 can be mixed up in a randomization of mixing operation 316. Each text segment 312 and the corresponding depersonalized audio feature 301 can be stored in a store and maintained for use by the system. For example, the text segments 312 and audio features 310 can be used to enable training of an acoustic model. The fact that the shreds 308 are in randomized order does not affect the training, because acoustic models for speech recognition relate to individual sounds. Maintaining the store can include storing each segment 312 together with its corresponding depersonalized audio feature 310, the text segments and corresponding depersonalized audio features being randomized, as shown at 318 in FIG. 3.

In some embodiments, the method or system of enabling training of an acoustic model may further include filtering the depersonalized audio features, for example, by removing the depersonalized audio features that are longer than a certain length. Filtering the depersonalized audio features can include examining the content of the text segments and removing the personalized audio features based on the content of the corresponding text segments. In some embodiments, removing the depersonalized audio features includes removing the depersonalized audio features whose corresponding text segments contain a phone number and at least two more words.

It should be noted that the shredding process as described herein is a one-way only process. The original message, or message corpus, cannot be reconstructed from the shreds.

Figure 4A:
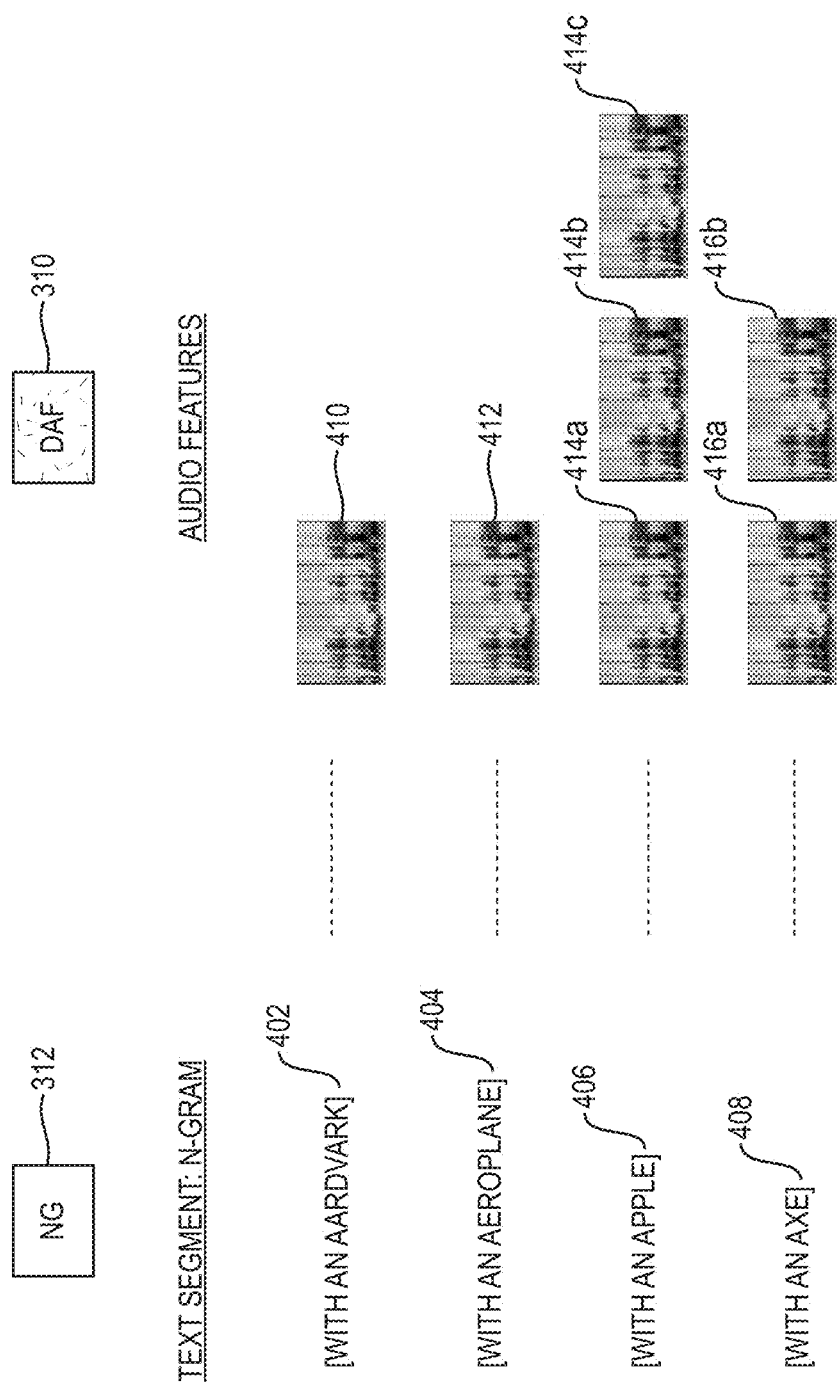
FIG. 4A is a diagram that illustrates example text segments (n-grams) and example audio features obtained using the method and system of FIG. 3.

FIG. 4A illustrates example text segments (e.g., n-grams or n-tuples) and example audio features obtained using the method of FIG. 3. In general, a depersonalized audio feature 310 may contain the same information, albeit in audio form, as its corresponding text segment or n-gram 312. As shown, a particular text segment or n-gram 402 may include three words ("with an aardvark") and correspond to an audio feature 410. In this example, only one speaker said the n-gram 402. In a second example, a text segment 404 ("with an airplane") corresponds to an audio feature 412. Again, only one speaker said this n-gram. A text segment 406 ("with an apple") was said by three speakers and is shown to correspond to audio features 414a, 414b, and 414c. Also shown is a text segment 408 ("with an axe") that was said by two speakers corresponding to audio features 416a and 416b.

The number of occurrences of audio features for each text segment is an indication of how many times a particular text segment was spoken in a particular speech corpus. As described in reference to FIG. 4A, multiple occurrences can indicate multiple speakers. The number of occurrences or counts may be used to compute statistics for automatic speech recognition. For example, segments of text whose corresponding counts are less than a number N may be removed from the training set. For example, if N=2, all segments of text having a corresponding count that is less than 2, i.e., a count of one, are removed. One reason for removing text segments that have low counts is that they represent rare text which may contain some information that is identifiable. Thus, removal of rare text segments improves the likelihood that PII is removed.

Figure 4B:
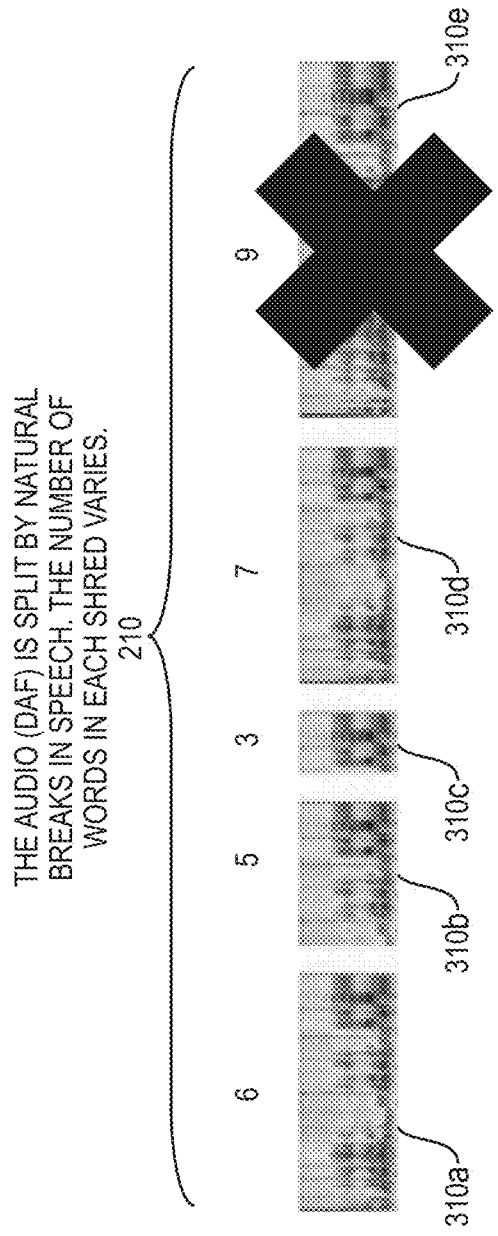
FIG. 4B is a diagram that illustrates filtering of audio features according to an embodiment of the invention.

FIG. 4B illustrates filtering of audio features according to an embodiment of the invention. As previously described, the audio 210 is split or shredded at natural breaks in speech. The resulting number of words in each shred can vary. As shown, the audio 210 is split into audio shreds 310a, 310b, 310c, 310d, and 310e. Any shred that includes too many words, i.e., more than a certain number, can be deleted. In the example shown, the audio shred 310e includes nine words and is deleted. It should be noted that each vocalization in the audio 210 is considered a word. For example, the number "152," when spoken, is considered to include five words, namely "one hundred and fifty two." Typical n-grams range in length (word count) from 1 to 7 words, with the average being 4.62 words long.

Figure 5:
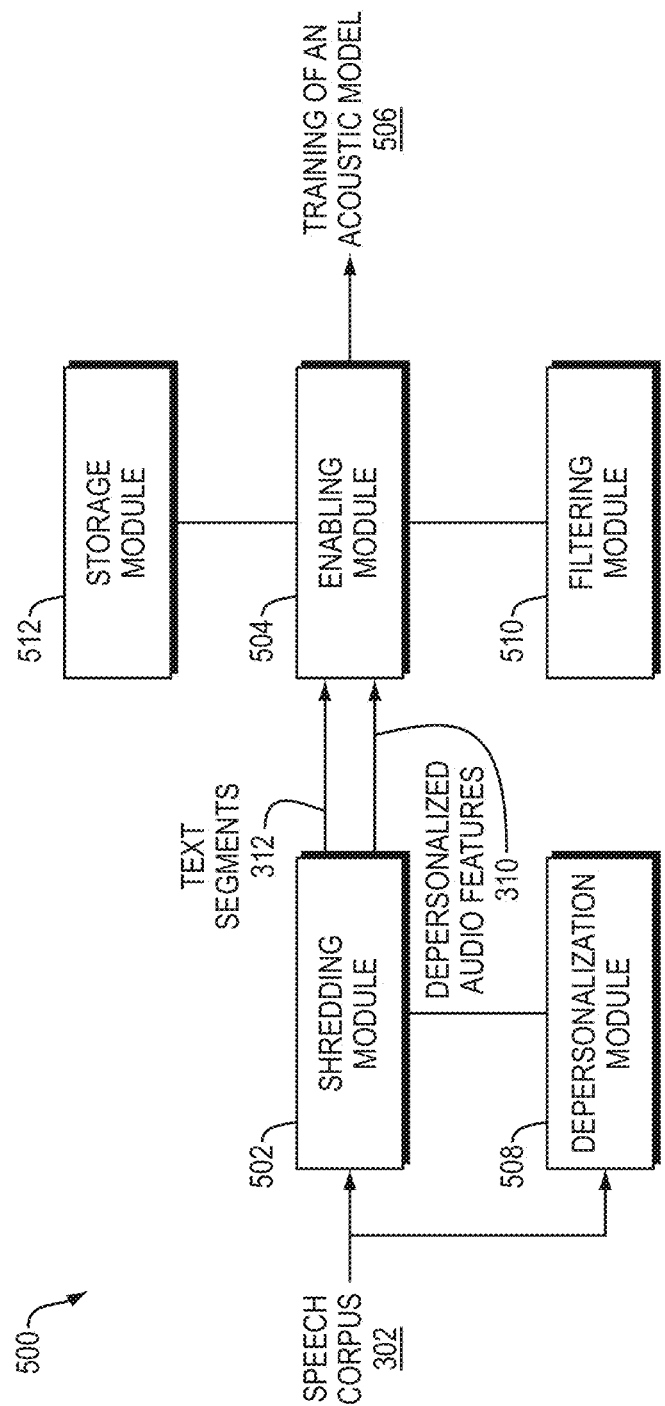
FIG. 5 is a block diagram illustrating an example embodiment of a system for enabling training of an acoustic model.

FIG. 5 is a block diagram illustrating an example embodiment of a system 500 for enabling training of an acoustic model. The system includes a shredding module 502 configured to shred a speech corpus 302 dynamically to produce text segments 312 and the personalized audio features 310 corresponding to the text segments. Also included is an enabling module 504 configured to enable a system to train an acoustic model (506) using the text segments 312 and the depersonalized audio features 310. The enabling module may enable a training system by adjusting the training system, for example, to use the text segments 312 and the depersonalized audio features 310.

As shown in FIG. 5, the system 500 can include a depersonalization module 508 configured to extract audio features from the speech corpus and depersonalize the audio features. The depersonalization module 508 can be configured to implement any depersonalization operation(s) described herein. The system may also include a filtering module 510 configured to filter the depersonalized audio features by removing depersonalized audio features longer than a certain length. Alternatively or in addition, the filtering module 510 can be configured to filter the depersonalized audio features by examining the content of the text segments and removing depersonalized audio features based on the content of the corresponding text segments. The filtering module 510 can be configured to implement any filtering operation(s) described herein. As shown, the system 500 can further include a storage module 512 configured to maintain a store of the text segments and the corresponding depersonalized audio features. For example, the storage module 512 may be configured to store each text segment together with its corresponding depersonalized audio feature and randomize the text segments and corresponding depersonalized audio features.

Figure 6:
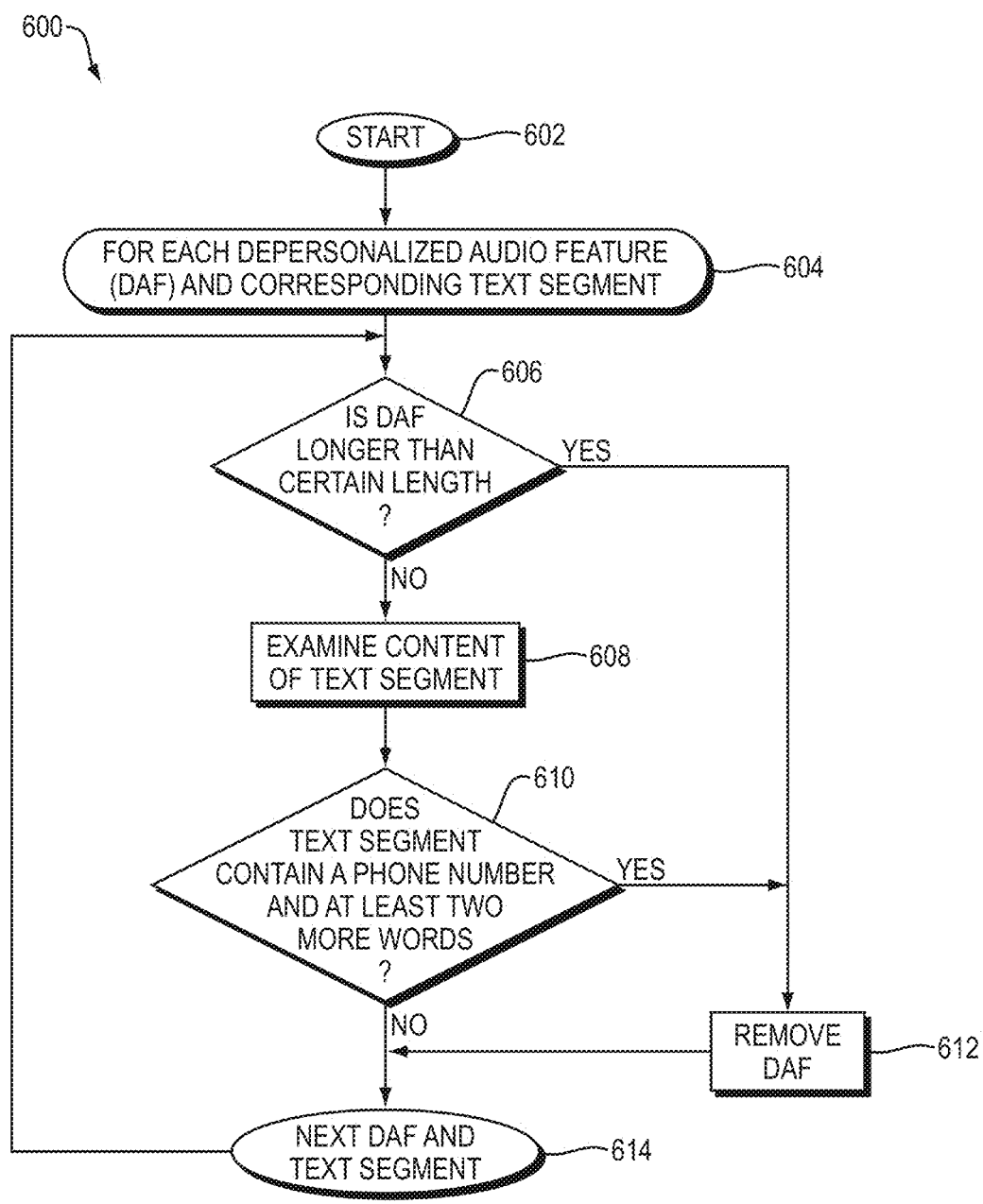
FIG. 6 is a flow diagram illustrating an example process of filtering audio features.

FIG. 6 is a flow diagram 600 illustrating an example process of filtering audio features, which may be implemented in the system of FIG. 5. After the process 600 starts (602), then, for each depersonalized audio feature (DAF) and corresponding text segment (604), the filtering module determines whether the DAF is longer than a certain length (606). If the DAF is longer than a certain length, the DAF is removed (612). Otherwise, the next DAF and text segment are processed (614). The rationale for removing DAF shreds longer than a certain length is that longer shreds may contain personally identifiable information.

Optionally, filtering the DAFs can be combined with content identification. For example, filtering the DAFs can include examining content of the text segments and removing DAFs based on the content of the corresponding text segments. In the example shown in FIG. 6, the filtering module can optionally determine whether the text segment contains a phone number and at least two or more words (610). If yes, the DAF is removed (612); if no, the DAF is retained. The next DAF and text segment are then processed (614).

Figure 7:
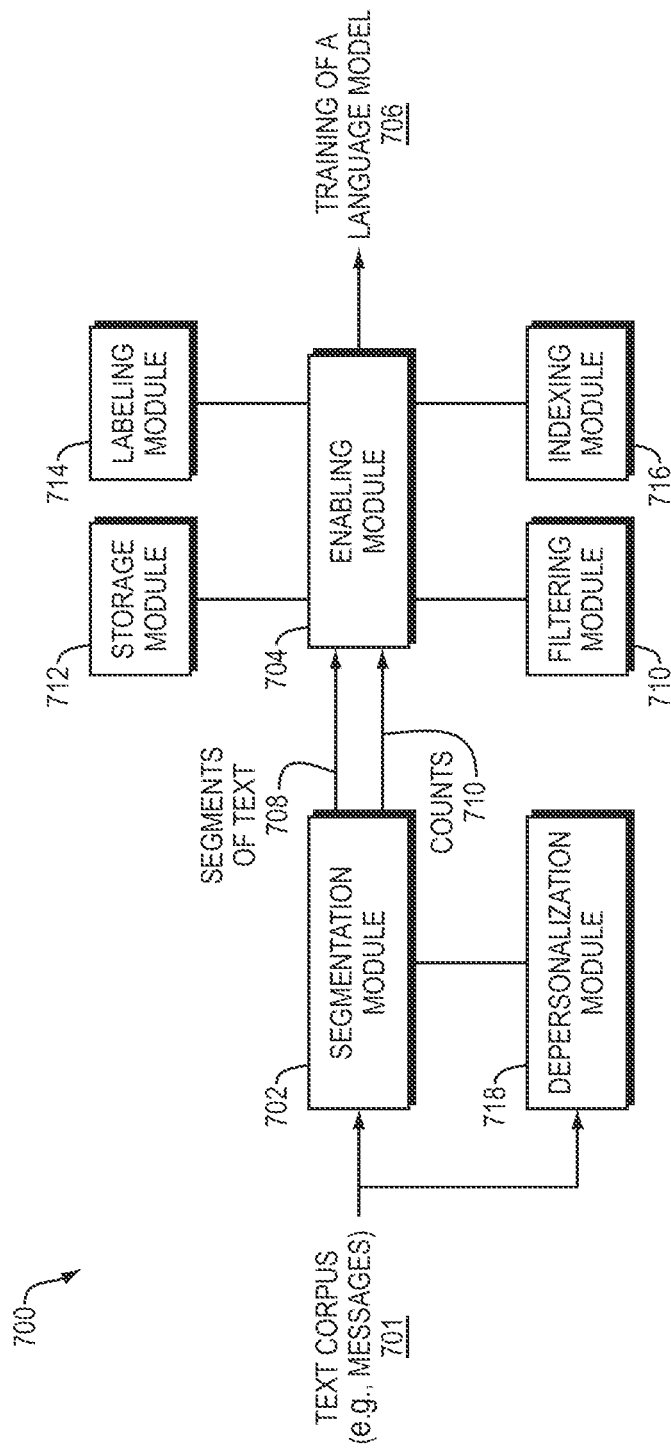
FIG. 7 is a block diagram illustrating an example embodiment of a system for enabling training of a language model.

FIG. 7 is a block diagram 700 illustrating an example embodiment of a system for enabling training of a language model. The system 700 includes a segmentation model 702 and enabling model 704. The segmentation module 702 is configured to produce segments of text 708 in a text corpus 701 and counts 710 corresponding to the segments of text. Here, the corpus can be in a depersonalized state. For example, the corpus can be in a depersonalized state because the corpus may have no personally identifiable information or because at least one item of personally identifiable information was removed or filtered out from the corpus. The enabling module 704 is configured to enable a system to train a language model (706) using the segments of text 708 in the depersonalized state and the counts 710. The enabling module 704 may enable a training system by adjusting the training system, for example, to use the segments of text 708 in the depersonalized state and the counts 710.

The segments of text can be n-tuples (or n-grams) and may be non-overlapping segments of text. In some embodiments, the system 700 may be configured to maintain a store of the segments of text and the counts. As shown in FIG. 7, the system can include a storage module 712 to implement this process. Maintaining the store can include removing all segments of text whose corresponding counts are less than N, and maintaining only the remaining segments of text and the counts. An example process for maintain a store of text segments that may be implemented in system 700 is described in reference to FIG. 8.

As shown in FIG. 7, the system 700 may include a depersonalization module 718 configured to depersonalize the corpus to change it from a personalized state to the depersonalized state. In an embodiment, depersonalizing the corpus includes replacing personally identifiable information in the corpus with class labels (not shown), wherein the personally identifiable information being replaced is personally identifiable information whose type can be identified by the class labels. For example, the personally identifiable information being replaced can include at least one of the following: a phone number, credit card number, name of a person, name of a business, or location. In the example of a phone number, the text of the phone number is removed from the message and replaced with a class label, e.g., "phone number" or "phone #" etc. Similarly, other example class labels are "credit card number," "personal name," "business name," or "location." The class label indicates a particular type of personally identifiable information only, but not the actual personally identifiable information. For example, "Hi Uwe, this is Jill" might be depersonalized as "Hi <MaleFirstName>, this is <FemaleFirstName>."

The system 700 may be configured to maintain a list of the class labels and counts corresponding to the class labels, the list not being linked to the corpus. For example, the system may retain one or more general class membership frequency lists, which are stored separately and without link or reference to any individual message or document. The system 700 can maintain the counts of what has been replaced per class label. In the above example, maintaining the list would result in count(MaleFirstName,Uwe)+=1 and count(FemaleFirstName, Jill)+=1. But the system is not maintaining any link of where in the depersonalized corpus these instances came from. The system, however, keeps track of how common "Uwe" is as a MaleFirstName. In an embodiment, the depersonalization module 718 is configured to maintain the list of class labels.

The system 700 can further include a filtering module 710 configured to filter the segments of text by removing from the segments of text those segments that contain personally identifiable information. The system 700 may further include a labeling module 714 configured to label the text segments and the counts with metadata. The metadata can be leveraged to accumulate statistics per metadata value/cluster. For example, the system may track Count(Year=2012, WordTuple), where WordTuple denotes the text segment(s). The metadata may include at least one of the following: time of day of the message, area code of the sender, area code of the recipient, or call duration.

In an embodiment, the system 700 includes an indexing module 716 configured to replace one or more words of the corpus with corresponding one or more word indices, wherein each word index is generated by a random hash.

Furthermore, the system, e.g., indexing module 716, may be configured to keep a map to the random hashes secure.

Figure 8:
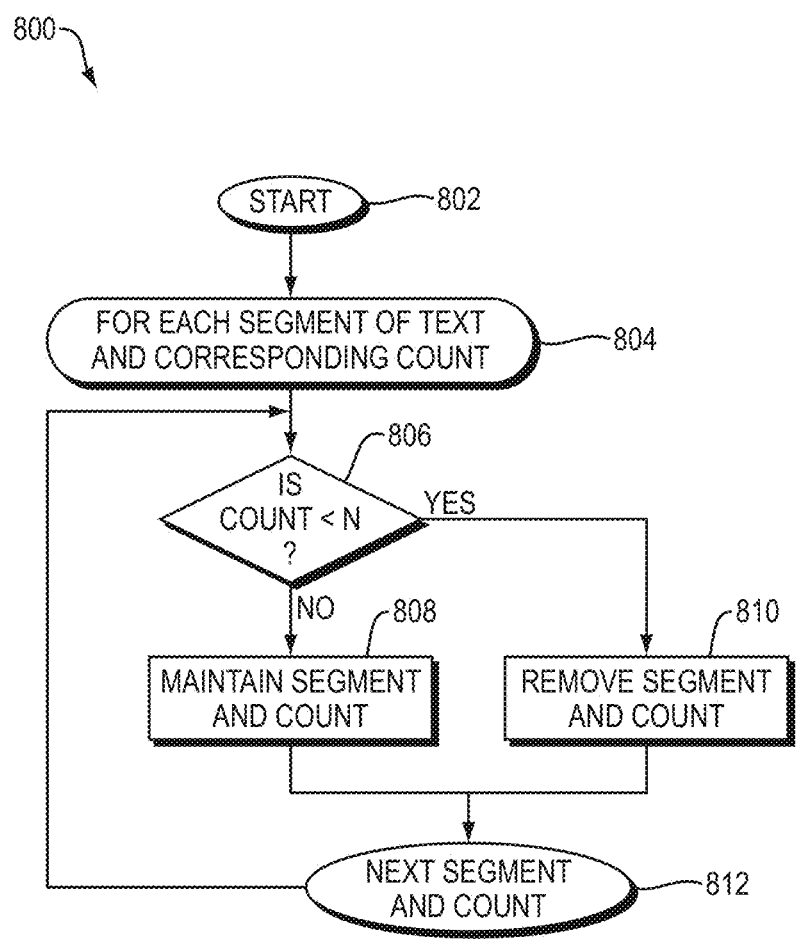
FIG. 8 is a flow diagram illustrating an example process of maintaining a store of segments of text and corresponding counts.

FIG. 8 is a flow diagram illustrating an example process 800 of maintaining a store of segments of text and corresponding counts, which may be implemented in the system of FIG. 7. After the process 800 starts (802), then, for each segment of text and corresponding count (804), the process determines whether the count is less than N (826). If the count is less than N, the text segment and corresponding count are removed (810). If the count is not less than N, the segment including its corresponding count is maintained (808). The next segment and count are then processed (812). The result of the filtering process 800 is that segments whose corresponding counts are less than N are removed from the store of text segments, and only the remaining segments of text and counts are maintained. As described above, removing text segments that have low counts effectively removes rare text that may contain personally identifiable information. Furthermore, long segments of text (e.g., greater than nine words) may also be removed, as described above in reference to FIG. 4B.

Figure 9:
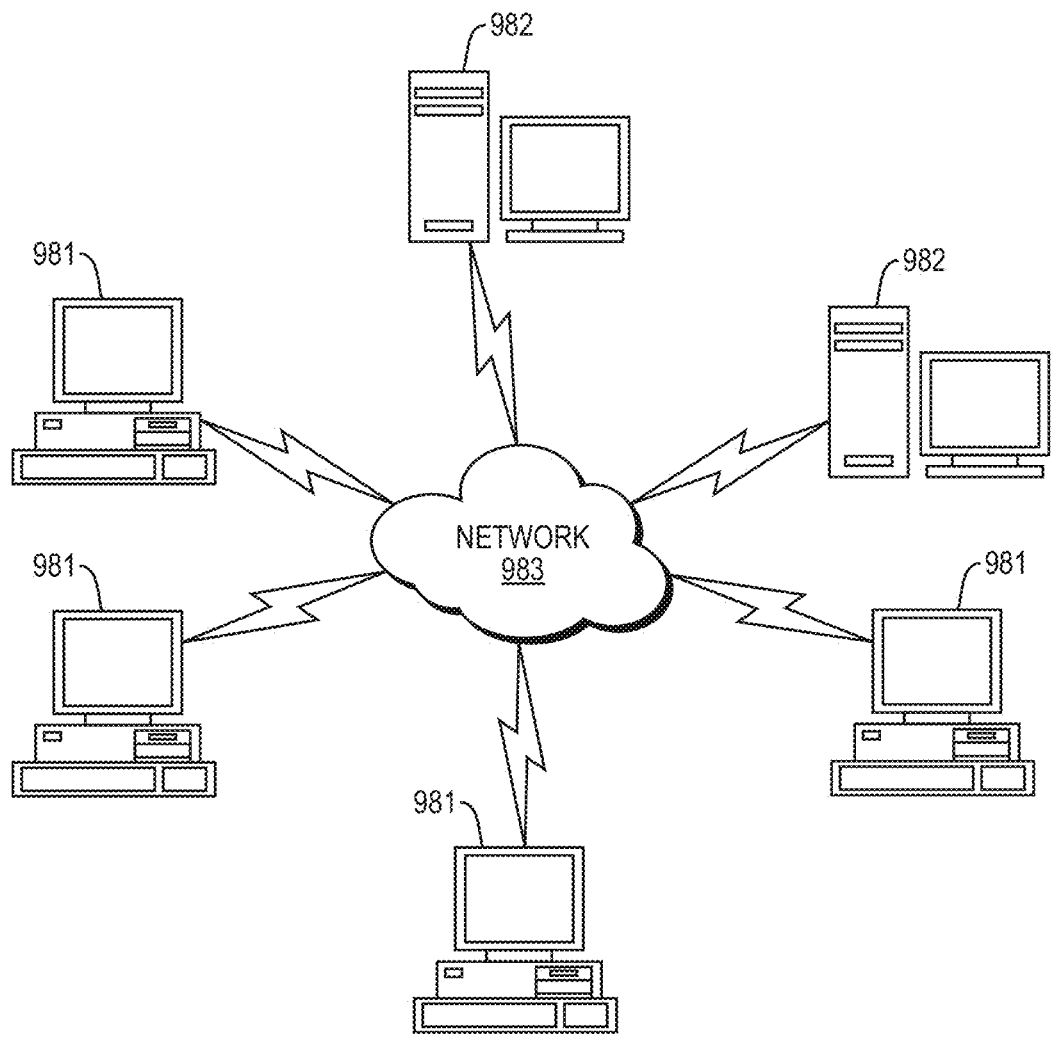
FIG. 9 is a network diagram illustrates an example computer network or similar digital processing environment in which an embodiment of the present invention may be implemented.

FIG. 9 illustrates a computer network or similar digital processing environment in which an embodiment the present invention may be implemented. Client computer(s)/devices 981 and server computer(s) 982 provide processing, storage, and input/output devices executing application programs and the like. Client computers 981 can include, for example, the computers of users training a language model and/or an acoustic model, in accordance with an embodiment of the invention; and server computers 982 can include the systems of FIGS. 2, 5 and/or 7, and/or other systems implementing a technique for enabling training of a language model and/or an acoustic model, in accordance with an embodiment of the invention. Client computer(s)/devices 981 can also be linked through communications network 983 to other computing devices, including other client devices/processes 981 and server computer(s) 982. Communications network 983 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 10:
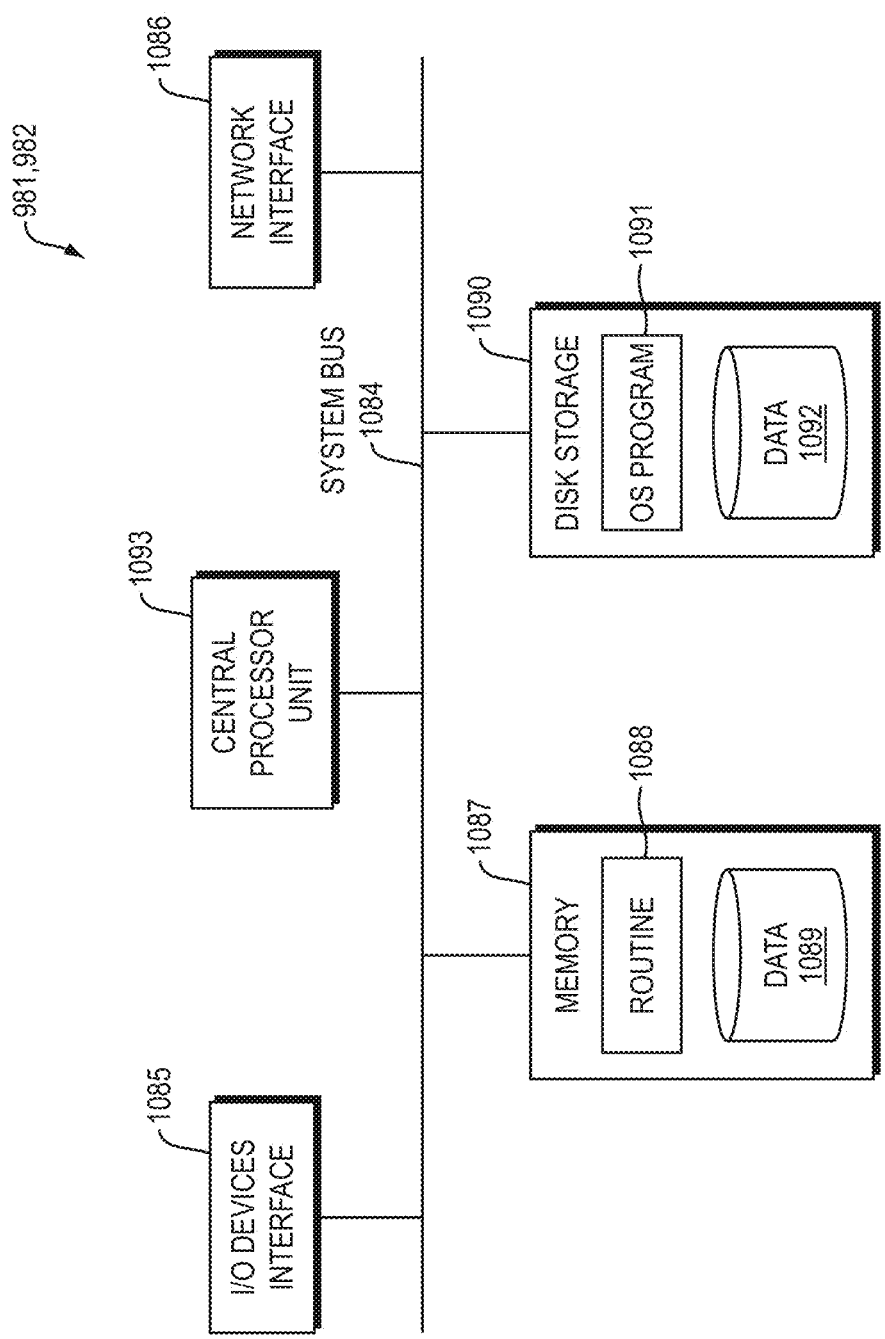
FIG. 10 is a diagram of an example internal structure of a computer in the example computer network of FIG. 9, in accordance with an embodiment of the invention.

FIG. 10 is a diagram of the internal structure of a computer (e.g., client processor/device 981 or server computers 982) in the computer system of FIG. 9, in accordance with an embodiment of the invention. Each computer 981, 982 contains system bus 1084, where a bus is a set of hardware lines used for data transfer among the components of a computer or processing system. Bus 1084 is essentially a shared conduit that connects different elements of a computer system (e.g., processor, disk storage, memory, input/output ports, network ports, etc.) that enables the transfer of information between the elements. Attached to system bus 1084 is I/O device interface 1085 for connecting various input and output devices (e.g., keyboard, mouse, displays, printers, speakers, etc.) to the computer 981, 982. Network interface 1086 allows the computer to connect to various other devices attached to a network (e.g., network 983 of FIG. 9). Memory 1087 provides volatile storage for computer software instructions 1088 and data 1089 used to implement an embodiment of the present invention (e.g., routines for enabling training of a language model and/or an acoustic model). Disk storage 1090 provides non-volatile storage for computer software instructions 1091 and data 1092 used to implement an embodiment of the present invention. Central processor unit 1093 is also attached to system bus 1084 and provides for the execution of computer instructions.

A system in accordance with the invention has been described which enables a system, e.g., a speech recognition system, to train a language model and/or an acoustic model. Components of such a system, for example a shredding module, segmentation module, enabling module and other systems discussed herein may, for example, be a portion of program code, operating on a computer processor.

Portions of the above-described embodiments of the present invention can be implemented using one or more computer systems, for example, to permit generation of ASR statistics for training of a language and/or an acoustic model. For example, the embodiments may be implemented using hardware, software or a combination thereof. When implemented in software, the software code can be stored on any form of non-transient computer-readable medium and loaded and executed on any suitable processor or collection of processors, whether provided in a single computer or distributed among multiple computers.

Further, it should be appreciated that a computer may be embodied in any of a number of forms, such as a rack-mounted computer, desktop computer, laptop computer, or tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, at least a portion of the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

In this respect, it should be appreciated that one implementation of the above-described embodiments comprises at least one computer-readable medium encoded with a computer program (e.g., a plurality of instructions), which, when executed on a processor, performs some or all of the above-described functions of these embodiments. As used herein, the term "computer-readable medium" encompasses only a non-transient computer-readable medium that can be considered to be a machine or a manufacture (i.e., article of manufacture). A computer-readable medium may be, for example, a tangible medium on which computer-readable information may be encoded or stored, a storage medium on which computer-readable information may be encoded or stored, and/or a non-transitory medium on which computer-readable information may be encoded or stored. Other non-exhaustive examples of computer-readable media include a computer memory (e.g., a ROM, RAM, flash memory, or other type of computer memory), magnetic disc or tape, optical disc, and/or other types of computer-readable media that can be considered to be a machine or a manufacture.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

While this invention has been particularly shown and described with references to example embodiments thereof, it will be understood by those skilled in the art that various changes in form and details may be made therein without departing from the scope of the invention encompassed by the appended claims. It should also be appreciated that the various technical features of the embodiments that have been described may be combined in various ways to produce numerous additional embodiments.

What is claimed is:

1. A method for training a language model of an automatic speech recognition system, the method comprising:
producing segments of text in a text corpus and counts corresponding to the segments of text, the text corpus being in a depersonalized state, the producing including dynamically shredding the text corpus into the segments of text in the depersonalized state;
further depersonalizing the segments of text based on the corresponding counts, each count representing a number of occurrences of a respective segment of text in the text corpus; and
enabling an automatic speech recognition system to train a language model using the segments of text in the depersonalized state and the counts.

2. The method according to claim 1, wherein the segments of text are non-overlapping.

3. The method according to claim 1, further comprising maintaining a store of the segments of text and the counts.

4. The method according to claim 3, wherein maintaining the store includes removing all segments of text whose corresponding counts are less than N, and maintaining only the remaining segments of text and the counts.

5. The method according to claim 1, further comprising depersonalizing the corpus to change it from a personalized state to the depersonalized state.

6. The method according to claim 5, wherein depersonalizing the corpus includes replacing personally identifiable information in the corpus with class labels, wherein the personally identifiable information being replaced is personally identifiable information whose type can be identified by the class labels.

7. The method according to claim 6, wherein the personally identifiable information being replaced includes at least one of the following: a phone number, credit card number, name of a person, name of a business, or location.

8. The method according to claim 6, further comprising maintaining a list of the class labels and counts corresponding to the class labels, the list not being linked to the corpus.

9. The method according to claim 1, further comprising filtering the segments of text by removing from the segments of text those segments that contain personally identifiable information.

10. The method according to claim 1, further comprising labeling the text segments and counts with metadata.

11. The method according to claim 10, wherein the metadata include at least one of the following: time of day of the message, area code of the sender, area code of the recipient, call duration, device type, or message type.

12. The method according to claim 1, further comprising:
replacing one or more words of the corpus with corresponding one or more word indices; and
generating each word index through use of a random hash.

13. The method according to claim 12, further comprising keeping a map to the random hashes secure.

14. The method according to claim 1, further comprising further depersonalizing the segments of text, used by the system to train the language model, as a function of the counts.

15. A system for training a language model of an automated speech recognition system, the system comprising:
at least one processor configured to implement:
a segmentation module configured to produce segments of text in a text corpus and counts corresponding to the segments of text, the text corpus being in a depersonalized state, the segments of text produced by dynamically shredding the text corpus into the segments of text in the depersonalized state;
a depersonalization module configured to further depersonalize the segments of text based on the corresponding counts, each count representing a number of occurrences of a respective segment of text in the text corpus; and
an enabling module configured to enable an automated speech recognition system to train a language model using the segments of text in the depersonalized state and the counts.

16. The system according to claim 15, wherein the at least one processor is operatively coupled to associated memory, and the at least one processor is further configured to implement a storage module configured to maintain a store of the segments of text and the counts in the associated memory.

17. The system according to claim 15, wherein the depersonalization module is further configured to depersonalize the corpus to change it from a personalized state to the depersonalized state.

18. The system according to claim 15, wherein the at least one processor is further configured to implement a filtering module configured to filter the segments of text by removing from the segments of text those segments that contain personally identifiable information.

19. The system according to claim 15, wherein the at least one processor is further configured to implement a labeling module configured to label the text segments and counts with metadata.

20. The system according to claim 15, wherein the at least one processor is further configured to implement an indexing module configured to:
   replace one or more words of the corpus with corresponding one or more word indices; and
   generate each word index through use of a random hash.

21. The system according to claim 15, further comprising a depersonalization module configured to further depersonalize the segments of text, used by the system to train the language model, as a function of the counts.

22. A computer program product comprising a non-transitory computer-readable medium storing instructions for performing a method for training a language model of an automatic speech recognition system, the instructions, when loaded and executed by a processor, cause the processor to:
   produce segments of text in a text corpus and counts corresponding to the segments of text, the text corpus being in a depersonalized state, the segments of text produced by dynamically shredding the text corpus into the segments of text in the depersonalized state;
   further depersonalize the segments of text based on the corresponding counts, each count representing a number of occurrences of a respective segment of text in the text corpus; and
   enable an automated speech recognition system to train a language model using the segments of text in the depersonalized state and the counts.

\* \* \* \* \*